US011502796B2

(12) United States Patent
Werner et al.

(10) Patent No.: US 11,502,796 B2
(45) Date of Patent: Nov. 15, 2022

(54) CSI REFERENCE SIGNALING IN LTE/NR COEXISTENCE

(71) Applicant: Telefonaktiebolaget LM Ericsson (publ), Stockholm (SE)

(72) Inventors: Karl Werner, Segeltorp (SE); Robert Baldemair, Solna (SE); Håkan Björkegren, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 67 days.

(21) Appl. No.: 16/972,194

(22) PCT Filed: Jun. 5, 2018

(86) PCT No.: PCT/SE2018/050588
§ 371 (c)(1),
(2) Date: Dec. 4, 2020

(87) PCT Pub. No.: WO2019/235981
PCT Pub. Date: Dec. 12, 2019

(65) Prior Publication Data
US 2021/0135813 A1  May 6, 2021

(51) Int. Cl.
*H04W 4/00* (2018.01)
*H04L 5/00* (2006.01)

(52) U.S. Cl.
CPC .......... *H04L 5/0048* (2013.01); *H04L 5/0053* (2013.01)

(58) Field of Classification Search
CPC ............................ H04L 5/0048; H04L 5/0053
(Continued)

(56) References Cited

U.S. PATENT DOCUMENTS

2016/0065390 A1* 3/2016 Kim ..................... H04L 25/0224
375/260
2017/0290016 A1* 10/2017 Yi ....................... H04W 72/042
(Continued)

FOREIGN PATENT DOCUMENTS

WO  WO-2011074807 A3 * 11/2011 ........... H04L 1/0003

OTHER PUBLICATIONS

Fujitsu (R1-1611463, Reno, Nov. 14-18, 2016, Aggregated CSI-RS Configuration and Signaling) (Year: 2016).*
(Continued)

*Primary Examiner* — Maharishi V Khirodhar
(74) *Attorney, Agent, or Firm* — Christopher & Weisberg, P.A.

(57) ABSTRACT

A method of operating a network node in a NR radio access network includes transmitting channel state information reference signaling, CSI-RS, the CSI-RS having a CSI-RS pattern in frequency domain over a range of subcarriers including a reference subcarrier, wherein in a first frequency range below the reference subcarrier, the CSI-RS pattern includes a first sub-pattern represented by a repeated flush arrangement of a pattern element covering a number NP of subcarriers, and in a second frequency range above the reference subcarrier, the CSI-RS pattern includes a second sub-pattern represented by a repeated flush arrangement of the pattern element, wherein the first sub-pattern and the second sub-pattern are separated in frequency domain by an interrupting pattern having a number NI of subcarriers, wherein NI> 0 and NI is different from NP. The disclosure also pertains to related methods and devices.

19 Claims, 3 Drawing Sheets

(58) Field of Classification Search
USPC .......................................................... 370/329
See application file for complete search history.

(56) References Cited

U.S. PATENT DOCUMENTS

2018/0091350 A1*  3/2018  Akkarakaran ........ H04L 5/0053
2021/0242990 A1*  8/2021  Baldemair ........ H04W 72/0453

OTHER PUBLICATIONS

ZTE [R1-1611430, Remaining discussion on non-precoded CSI-RS design for eFD-MIMO, Reno, U.S.A., Nov. 14-18, 2016] (Year: 2016).*
International Search Report and Written Opinion of the International Searching Authority, PCT/SE2018/050588, dated Feb. 12, 2019, 10 pages.
Ericsson, 3GPP TSG-RAN WG1 NR Ad Hoc #3, R1-1716372, "Details on CSI-RS design," Nagoya, Japan, Sep. 18-21, 2017, 10 pages.
Samsung, 3GPP TSG RAN WG1 Meeting 91, R1-1720351, "On Rate Matching," Reno, USA, Nov. 27-Dec. 1, 2017, 8 pages.
Samsung, 3GPP TSG RAN WG1 Meeting NR-AH#3, R1-1715966, "Remaining details on NR CSI-RS," Nagoya, Japan, Sep. 18-21, 2017, 11 pages.
Ericsson, 3GPP TSG-RAN WG1, Meeting #89ah-NR, R1-1711041, "On CSI-RS Design for CSI acquisition," Qingdao, China, Jun. 27-30, 2017, 11 pages.

* cited by examiner

CSI REFERENCE SIGNALING IN LTE/NR COEXISTENCE

CROSS REFERENCE TO RELATED APPLICATIONS

This application is a 35 U.S.C. § 371 national stage application of PCT International Application No. PCT/SE2018/050588 filed on Jun. 5, 2018, the disclosure and contents of which are incorporated by reference herein in its entirety.

TECHNICAL FIELD

This disclosure pertains to wireless communication technology, in particular in the context of coexistence of radio access of different technologies.

BACKGROUND

Some radio access technologies like LTE and NR will be operating in the same frequency ranges, requiring approaches allowing coexistence for example such that for overlapping or coordinated cells or transmissions, undesired interference is limited.

SUMMARY

It is an object of the present disclosure to provide approaches facilitating coexistence of different RATs, in particular in the context of reference signals, with little signaling overhead and/or allowing efficient use of available resources.

The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

There is disclosed a method of operating a network node in a NR radio access network. The method comprises transmitting channel state information reference signaling, CSI-RS. The CSI-RS has a CSI-RS pattern in frequency domain over a range of subcarriers including a reference subcarrier. In a first frequency range below the reference subcarrier, the CSI-RS pattern comprises a first sub-pattern represented by a repeated flush arrangement of a pattern element covering a number NP of subcarriers. In a second frequency range above the reference subcarrier, the CSI-RS pattern comprises a second sub-pattern represented by a repeated flush arrangement of the pattern element, wherein the first sub-pattern and the second sub-pattern are separated in frequency domain by an interrupting pattern having a number NI of subcarriers, wherein NI>0 and NI is different from NP.

Moreover, there is disclosed a network node for a NR radio access network. The network node is adapted for transmitting channel state information reference signaling, CSI-RS, the CSI-RS having a CSI-RS pattern in frequency domain over a range of subcarriers including a reference subcarrier. In a first frequency range below the reference subcarrier, the CSI-RS pattern comprises a first sub-pattern represented by a repeated flush arrangement of a pattern element covering a number NP of subcarriers. In a second frequency range above the reference subcarrier, the CSI-RS pattern comprises a second sub-pattern represented by a repeated flush arrangement of the pattern element, wherein the first sub-pattern and the second sub-pattern are separated in frequency domain by an interrupting pattern having a number NI of subcarriers, wherein NI>0 and NI is different from NP. The network node may comprise, and/or be adapted for utilising, processing circuitry and/or radio circuitry, in particular a transmitter and/or transceiver, for transmitting the CSI-RS.

Transmitting CSI-RS may comprise, and/or be based on, scheduling the CSI-RS and/or configuring a user equipment for receiving and/or reporting on the CSI-RS.

Moreover, there is disclosed a method of operating a user equipment, or more generally a radio node, in a NR radio access network. The method comprises receiving channel state information reference signaling, CSI-RS. Receiving the CSI-RS signaling is based on a CSI-RS pattern. The CSI-RS pattern covers in frequency domain a range of subcarriers. Furthermore, the CSI-RS pattern is determined, based on a coordination indication indicating presence of Cell-Specific Reference Signaling, to include a reference subcarrier, and to comprise, in a frequency range below the reference subcarrier, a first sub-pattern represented by a repeated flush arrangement of a pattern element covering a number NP of subcarriers, and to comprise in a second frequency range above the reference subcarrier, a second sub-pattern represented by a repeated flush arrangement of the pattern element. The first sub-pattern and the second sub-pattern are separated by an interrupting pattern having a number NI of subcarriers, wherein NI>0 and NI is different from NP.

A user equipment or radio node for a NR radio access network is considered. The user equipment or radio node is adapted for receiving channel state information reference signaling, CSI-RS. Receiving the CSI-RS is based on a CSI-RS pattern, wherein the CSI-RS pattern covers in frequency domain a range of subcarriers. The CSI-RS pattern is determined, based on a coordination indication indicating presence of Cell-Specific Reference Signaling, to include a reference subcarrier, and to comprise, in a frequency range below the reference subcarrier, a first sub-pattern represented by a repeated flush arrangement of a pattern element covering a number NP of subcarriers, and to comprise in a second frequency range above the reference subcarrier, a second sub-pattern represented by a repeated flush arrangement of the pattern element. The first sub-pattern and the second sub-pattern are separated by an interrupting pattern having a number NI of subcarriers, wherein NI>0 and NI different from NP. The user equipment or radio node may comprise, and/or be adapted for utilising, processing circuitry and/or radio circuitry, in particular a receiver and/or transceiver, for receiving the CSI-RS.

NI may be larger than NP, e.g. NI=NP+1 or NP+2. In some variants, NI may be smaller than NP. The size of NI may be dependent on how close to the reference subcarrier the closest pattern element of the first sub-pattern and/or second sub-pattern element may be arranged and/or mapped. In general, the interrupting pattern may be different from the pattern element, e.g. represent a different pattern.

A pattern element may comprise a plurality of subcarriers, wherein each subcarrier of the pattern element is neighboring to at least one other subcarrier of the pattern element, wherein the plurality of subcarriers comprises one or more subcarriers for carrying CSI-RS (c-subcarriers) and one or more subcarriers not for carrying CSI-RS (nc-subcarriers). A pattern element may represent a structure and/or order of subcarriers, and may be mapped to a resource grid and/or resource elements such that in frequency domain resource elements are associated to c-subcarriers or nc-subcarriers according to the pattern element. C-subcarriers of the pattern element may be arranged such that each c-subcarrier neighbors at least one other c-subcarrier of the pattern element, if it comprises 2 or more c-subcarriers. Nc-subcarrier of the pattern element of the pattern element may be arranged such that each nc-subcarrier neighbors at least one other nc-subcarrier of the pattern element. One of the c-subcarriers may neighbor one of the nc-subcarriers.

A pattern may generally indicate a frequency distribution of c-subcarriers and/or nc-subcarriers. A pattern element may represent a specific form of a pattern. Receiving CSI-RS based on a pattern may comprise associated signaling and/or symbols received on subcarriers covered by the pattern according to the pattern. For example, signaling on c-subcarriers may be associated to CSI-RS. A CSI-pattern may pertain to and/or cover a plurality of subcarriers, in particular a plurality of physical resource blocks, each of which may comprise 12 subcarriers. A subpattern may pertain to a subcarrier/PRB range within the range of the CSI-pattern.

Receiving CSI-RS may comprise performing measurements on the CSI-RS, and/or transmitting a measurement report based on received CSI-RS. Transmitting the measurement report may be based on a configuration, e.g. based on higher-layer configuration and/or control information like DCI.

A pattern element may be a comb element, which may combine one (or more) subcarrier for carrying CSI-RS, and one or more subcarriers not for carrying CSI-RS. Different comb elements may be combined to define a new comb.

The CSI-RS signaling (also referred to as CSI-RS in short) may be scheduled, e.g. by the network node. It may for example be indicated to a user equipment with control information, e.g. DCI, in particular a scheduling assignment, and/or a higher-layer configuration. The CSI-RS signaling may be transmitted to, and/or intended for, one (target) user equipment. However, variants with transmission to, and/or intended for, multiple target UEs may be considered, e.g. for common and/or multicast and/or broadcast signaling. The frequency range of the CSI-RS and/or associated pattern may be indicated and/or based on scheduling. It may represent a part of a carrier and/or bandwidth part, e.g. an active bandwidth part. The frequency range may overlap with a carrier frequency range of an LTE carrier, in particular in NR/LTE coexistence. It may be considered that the frequency range overlaps with a central region of an LTE carrier, which may comprise a DC subcarrier and/or central frequency subcarrier. The transmission may be downlink transmission. Transmitting CSI-RS may comprise beamforming the CSI-RS transmission.

A repeated flush arrangement of a pattern element may be represented by an arrangement of multiple instances of the pattern element in a subcarrier subrange such that each instance is neighboring to at least one other instance. Thus, multiple mapping of resource elements to instances of the pattern element anchored and/or mapped to different subcarrier grouping may be considered. Each subcarrier grouping may be anchored to a specific subcarrier, based on which a subcarrier distribution according to the pattern element may be considered.

The CSI-RS pattern may be a pattern for one symbol. In some cases, it may extend over two symbols, e.g. if CRS is present over two symbols. It may be considered that for neighboring symbols, different CSI-RS patterns are used, in particular if in a second symbol, no CRS is indicated.

The CSI-RS pattern may be transmitted based on a coexistence indication indicating presence of Cell-Specific Reference Signaling (CRS). If no presence is indicated, another CSI-RS pattern may be considered, in which the first sub-pattern neighbors the second sub-pattern, and/or the first sub-pattern represents the complete CSI-RS pattern. The network node may determine, and/or be adapted to determine, which pattern to use based on a coexistence indication. Alternatively, or additionally, the user equipment may determine, and/or be adapted to determine, which pattern to use based on the coordination indication. Determining the pattern may be part of transmitting the CSI-RS, and/or of receiving the CSI-RS, respectively.

In some variants, the reference subcarrier may correspond to a central-frequency subcarrier or DC subcarrier of an LTE carrier. A coexistence indication and/or coordination indication may indicate the corresponding reference subcarrier, e.g. central frequency and/or subcarrier number.

It may be considered that the interrupting pattern comprises one subcarrier not for carrying CSI-RS, which may be arranged on the reference subcarrier, or on a subcarrier neighboring the reference subcarrier. The subcarrier may be added to a pattern element. In some cases, a pattern element may be shortened by one or more subcarriers to represent the interrupting pattern.

There is also disclosed a program product comprising instructions adapted for causing processing circuitry to control and/or perform a method as described herein. A carrier medium arrangement carrying and/or storing a program product may be considered.

A network node may be considered a radio node. A first RAT may be represented by, and/or be based on NR RAT, a second RAT may be represented by and/or based on LTE RAT. A radio node in a radio access network may operate according to associated RAT. For example, a radio node in or for a NR radio access network may operate and/or be operable according to NR RAT.

Instead of a user equipment, a radio node like a network node (e.g., relay node or backhaul node or micro-node) may be considered, e.g. in a relay or backhaul scenario.

A coexistence indication may be received by the network node, e.g. from another network node, e.g. via a suitable interface. Alternatively, or additionally, the coexistence indication may be determined by the network node, e.g. based on measurements, e.g. of signaling typical and/or representative for the second RAT, and/or reading from a memory. The coordination indication may be received by the user equipment, e.g. from a network node, which may be operating according to the first RAT and/or second RAT. Alternatively, or additionally, the coordination indication may be determined by the user equipment, e.g. based on measurements, e.g. of signaling typical and/or representative for the second RAT, and/or reading from a memory. In general, it may be assumed that the network node and/or the user equipment are aware of operation according to the first RAT and second RAT on a common frequency range. Operation according to the first RAT may be such that resources not used for operating according to the second RAT are utilised. A network node operating according to the first RAT may coordinate with, and/or exchange information with, a network node operating according to the second RAT. It should be noted that such nodes could be physically identical devices, or be separated from each other. The coexistence indication and/or the coordination indication may indicate the presence of the cell-specific reference signaling based on indicating operation according to the second RAT, and/or based on explicitly indicating the signaling, and/or indicating the location in time and/or frequency of the cell-specific reference signaling.

A comb may generally represent a distribution of subcarriers in which a number C or nc-subcarriers is included in a pattern element, e.g. in a subcarrier grouping neighboring a subcarrier grouping of one or more c-subcarriers. C may be 0 or larger; in some cases, two or more combs with N1 or N2 may be combined to form a comb of different N3 that is smaller than N1 and N2. A RAT may in general describe a standard of communication, e.g. signaling structures and/or protocols. Operation according to the first RAT and the second RAT may be synchronised.

In general, the resource elements for CSI-RS (associated to c-subcarriers) may be shifted in frequency relative to positions of resource elements for cell-specific reference symbols. It may generally be considered that the location of CSI-RS and/or associated resource elements or c-subcarriers is shifted in frequency relative to cell-specific reference signaling of the second RAT on the same symbol. The locations of REs or subcarriers carrying CRS may be known to the user equipment or network node in coexistence scenarios.

In particular, the first RAT may correspond to New Radio, NR technology, and the second RAT corresponds to Long Term Evolution, LTE, technology. In general, cell-specific reference signaling may be CRS (Cell-Specific Reference Signaling). The reference signaling may be according to a specific pattern, e.g. as prescribed and/or configured for the operation according to the second RAT.

The coexistence indication may represent the network node's awareness that operation may occur according to the second RAT, e.g. in a common cell and/or section and/or angular or spatial or geographical region. Operation may be such that resource are shared, e.g. such that at instances of time and/or frequency, operation is according to only one RAT. The coordination indication may represent the same for the UE.

The approaches described herein facilitate negative impact of transmission in the first RAT on cell-specific reference signals of the second RAT, which typically are particularly important for operating according to the second RAT. The approaches allow fitting CSI-RS of the first RAT and CRS of the second RAT onto the same symbol without interference. As data, e.g. on PDSCH, may be more flexibly allocated or scheduled to resource elements, or may be dropped with less dramatic components, interference may be limited and/or avoided.

The pattern element and/or comb, and/or starting subcarrier and/or ending subcarrier and/or extension in frequency space, may be indicated (e.g., to UE or radio node), e.g. with higher-layer signaling and/or control information, e.g. DCI and/or a scheduling assignment. In particular, an indicator indicating the pattern element, e.g. pointing to a table or to a pattern element configuration, may be utilised. The approaches allow efficient use of such signaling, as it is not required to configure or indicate multiple patterns. In this context it should be noted that the both UE and network node may be configured to determine the interrupting pattern in the same way, respectively whether to use the interrupting pattern or not, e.g. based on the coordination indication or coexistence indication, respectively.

BRIEF DESCRIPTION OF THE DRAWINGS

The drawings are provided to illustrate concepts and approaches described herein, and are not intended to limit their scope. The drawings comprise.

DETAILED DESCRIPTION

In radio access networks, reference signaling is usually transmitted in a pattern in frequency domain. In general, a pattern may be non-continuous, such that subcarriers (non-carrying subcarriers, nc-subcarriers) not carrying reference signals of the specific signaling are located between subcarriers (carrying subcarriers, c-subcarriers) carrying such. Note that nc-subcarriers may carry other kinds of signaling, e.g. data signaling, or control signaling, or other reference signaling, or may be empty. The term "non-carrying" may be considered to refer to the specific reference signaling and/or associated pattern. A pattern may comprise a pattern element, which may be repeated multiple times over a frequency range the pattern covers. A pattern element may cover and/or comprise a plurality of subcarriers, e.g. one or more c-subcarriers and one or more nc-subcarriers. A pattern element may be considered a resource structure in frequency domain.

One form of pattern is a comb, in which between c-subcarrier groups of one or more c-subcarriers, there may be inserted M (M=one or more) nc-subcarriers. The comb then may be referred to as M+L-comb, with L being the number of c-subcarriers in the comb. In some variants, M=0 may be considered as comb as well. Multiple combs may be combined over a frequency range, e.g., to provide a comb-pattern with a lower effective M than provided by individual combs. Using a comb allows efficient configuring and/or scheduling of reference signaling, as the pattern can be easily identified e.g., by border information (e.g. indicating starting and/or ending subcarrier, and/or range of subcarriers) and comb-size and/or c-subcarrier group size), optionally for more than one comb over the same frequency range or overlapping frequency ranges, and/or at the same time, e.g. at least one symbol).

For LTE, for each carrier, there is defined a DC-subcarrier which usually does not carry signaling. For mapping reference signaling, e.g. cell-specific reference signaling like CRS, to subcarriers according to a pattern like a comb, the DC-subcarrier is usually not counted. Thus, a pattern crossing the DC subcarrier in frequency domain for LTE shows a jump in its physical subcarrier distribution.

For NR, there is no DC-subcarrier defined. This may lead to issues if patterns defined for NR have to be adapted to patterns for LTE. Both LTE and NR provide limitations to flexibility due to a standardized scheduling and signaling structures. Smart approaches allowing efficient use of resources in coexistence considered such limitations are considered. A particular issue is related to CRS of LTE, which has to be regularly provided for sound functioning of an LTE network, and has relatively fixed patterns covering a wide frequency range in a carrier.

In the following, variants are described in the context of NR/LTE coexistence, however, the approaches may be implemented in different contexts.

Figure 1:
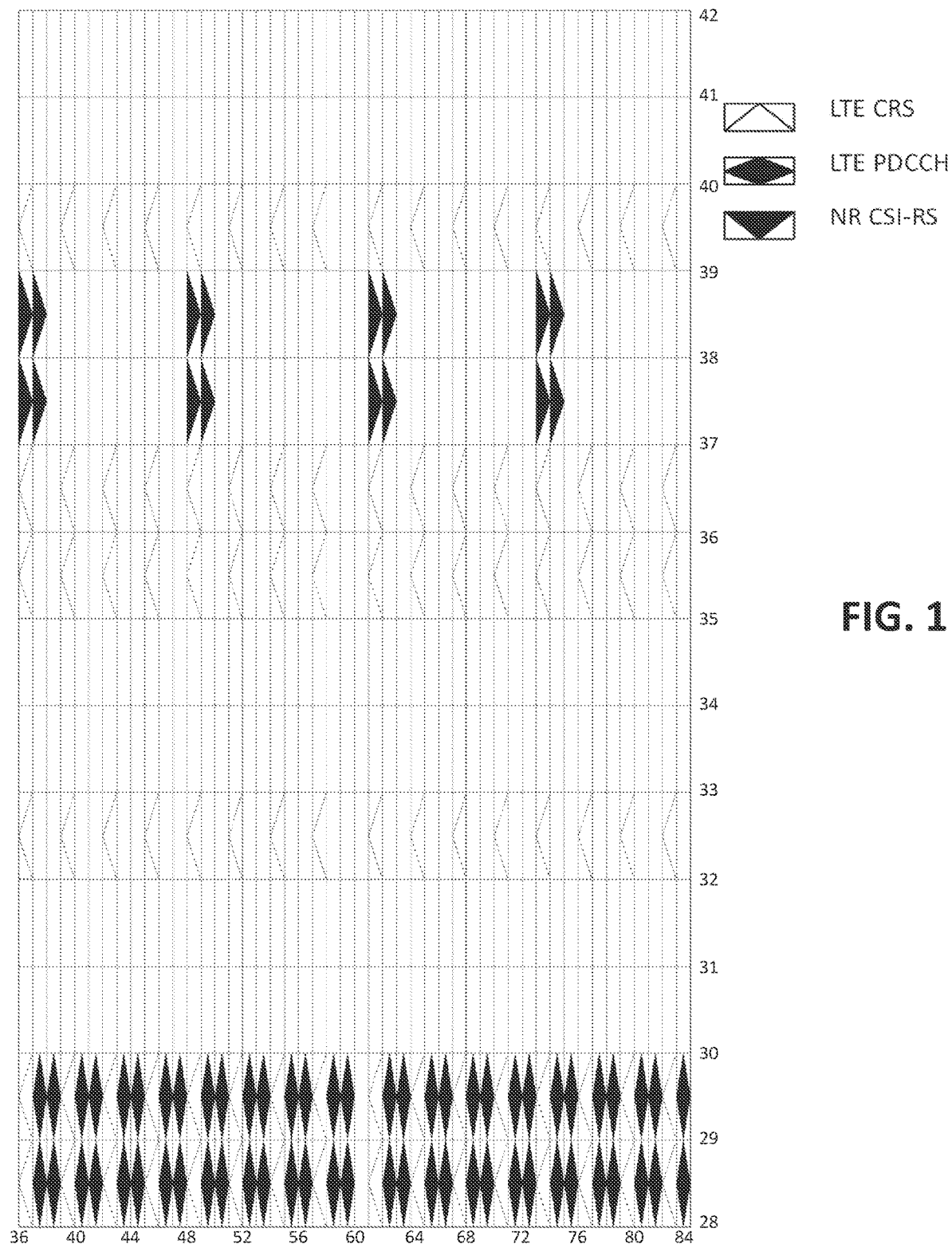
FIG. 1, showing a resource grid for LTE/NR coexistence.

FIG. 1 shows a cut of a resource grid in a LTE/NR coexistence scenario, on a shared frequency range used both by LTE and NR, for ease of reference having the same numerology. Cases in which different numerologies are used may be considered. The x-axis shows a running number of symbols, which are grouped into 14 symbols to form a NR slot, and an LTE subframe. Symbol 28 represents the starting symbol 0 in a slot/subframe, which runs to include symbol 42, and then another slot/subframe starts (the symbols in each slot/subframe may be numbered from 0 to 13, the numbering in FIG. 1 relates to a numbering referring to a frame comprising a plurality of slots/subframes). The y-axis represents subcarriers of a frequency range on a carrier shared by the LTE/NR systems, for LTE/NR coexistence. Subcarrier 60 corresponds to the reference subcarrier, also referred to as DC subcarrier or central frequency subcarrier according to LTE. LTE CRS is provided in a comb-3, and has a jump of one subcarrier at the reference subcarrier, which is not used and/or counted for the CRS pattern or other signaling. In NR, the reference subcarrier, however, may be used freely, if effects of LTE coexistence are disregarded. In symbols 37 and 38, a sub-pattern with comb-12 pattern elements with two neighboring c-subcarriers and ten neighboring nc-subcarriers for NR-CSI-RS is shown below the reference signaling. It should be noted that in the example, the increasing subcarrier number corresponds to decreasing frequency. An interrupting pattern is represented by the 13-subcarriers starting from the reference subcarrier extending upwards. A second sub-pattern with a comb-12 pattern element corresponding to the pattern element of the first sub-pattern continues the pattern.

For transmission of the CSI-RS pattern in the same symbol/s as the LTE CRS, it may be shifted in frequency by one subcarrier, to fit the c-subcarriers onto subcarriers not carrying LTE CRS. Without the interrupting pattern, if the first sub-pattern would be extended across the reference subcarrier, interference of CSI-RS and CRS would be unavoidable, or CSI-RS would have to be dropped on some subcarriers, negatively impacting CSI reporting. As CSI-reporting is of importance e.g. for link adaptation and/or in particularly for NR systems with heavy beamforming, this could negatively impact system efficiency.

It is suggested to transmit the CSI-RS such that it crosses the reference subcarrier, facilitating efficient use of frequency resources and reliable measurement reporting. An interrupting subcarrier may be inserted into the pattern. Accordingly, a second sub-pattern above the reference subcarrier will be created, based on the same pattern element, such that between the first sub-pattern and the second sub-pattern, a third, interrupting sub-pattern is arranged, which has a different number of subcarriers than the pattern element, in this case 13.

Figure 2:
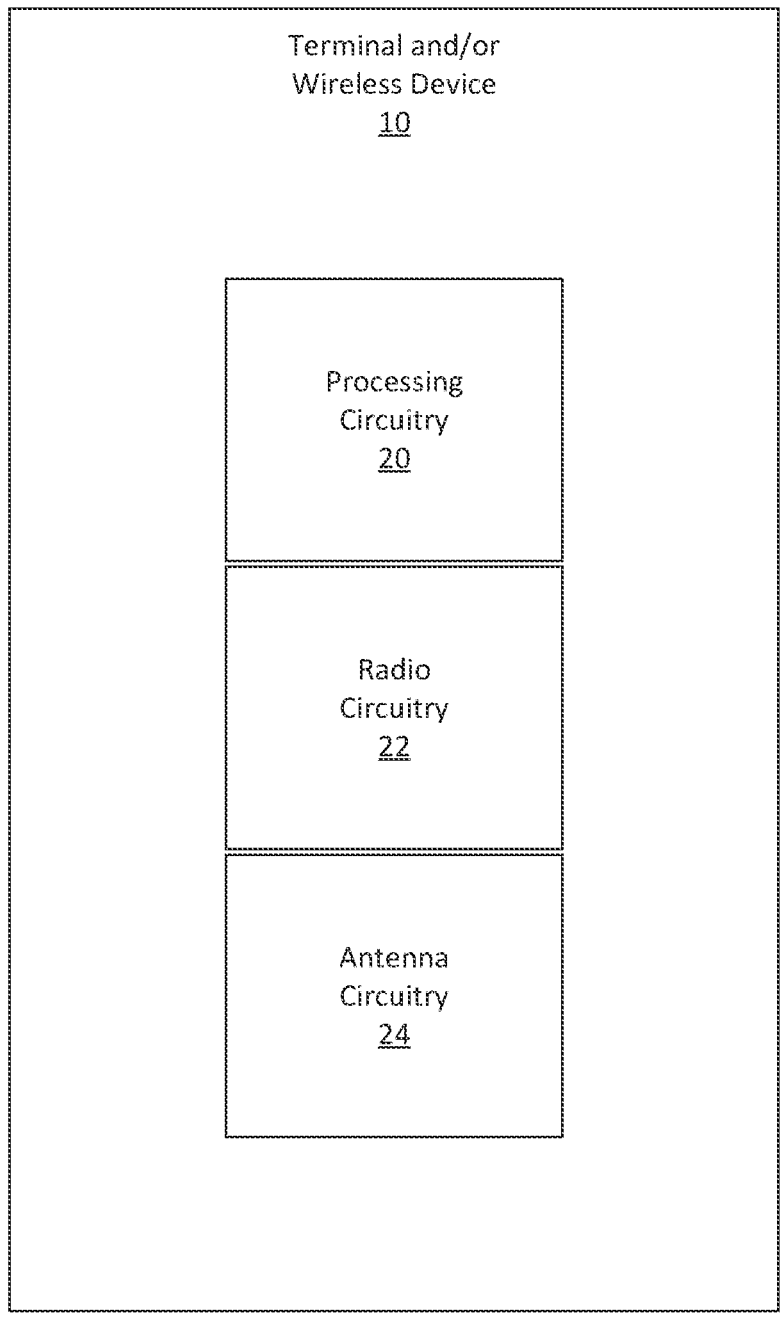
FIG. 2, an exemplary radio node implemented as terminal or UE.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
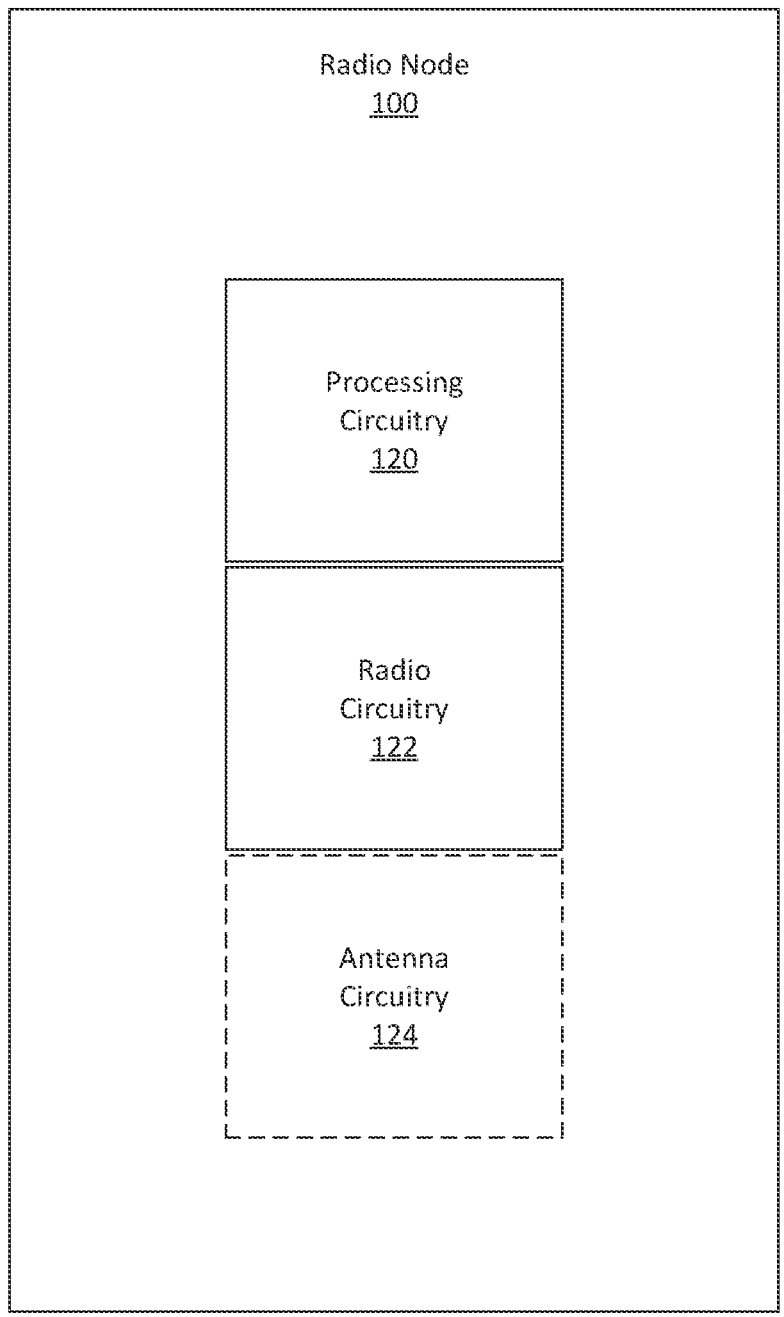
FIG. 3, an exemplary radio node implemented as network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

A border subcarrier may generally represent a starting subcarrier (e.g., subcarrier lowest in frequency domain) or an ending subcarrier (e.g., highest in frequency domain) of a resource structure, e.g. for transmitting and/or receiving.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches. A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure like a pattern or pattern element in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
CAZAC Constant Amplitude Zero Cross Correlation
CBG Code Block Group
CDM Code Division Multiplex
CM Cubic Metric
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
FDM Frequency Division Multiplex
HARQ Hybrid Automatic Repeat Request
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RB Resource Block
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TDM Time Division Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3GPP usage if applicable.

The invention claimed is:

1. A method of operating a network node in a New Radio, NR, radio access network, the method comprising:
transmitting channel state information reference signaling, CSI-RS, the CSI-RS having a CSI-RS pattern in frequency domain over a range of subcarriers including a reference subcarrier, such that in a first frequency range below the reference subcarrier, the CSI-RS pattern comprises a first sub-pattern represented by a repeated flush arrangement of a pattern element covering a number NP of subcarriers, the repeated flush arrangement being an arrangement of multiple instances of the pattern element in a subcarrier sub-range such that each instance of the pattern element is neighboring to at least one other instance of the pattern element,
and in a second frequency range above the reference subcarrier, the CSI-RS pattern comprises a second sub-pattern represented by a repeated flush arrangement of the pattern element, the first sub-pattern and the second sub-pattern being separated in frequency domain by an interrupting pattern having a number NI of subcarriers, NI>0 and NI being different from NP, the size of NI being dependent on how close to the reference subcarrier the closest pattern element of at least one of the first sub-pattern and second sub-pattern element is at least one of arranged and mapped.

2. The method according to claim 1, wherein the pattern element comprises a plurality of subcarriers, wherein each subcarrier of the pattern element is neighboring to at least one other subcarrier of the pattern element, wherein the plurality of subcarriers comprises one or more subcarriers for carrying CSI-RS and one or more subcarriers not for carrying CSI-RS.

3. The method according to claim 1, wherein the pattern element comprises a comb element that combines one subcarrier for carrying CSI-RS and one or more subcarriers not for carrying CSI-RS.

4. The method according to claim 1, wherein repeated flush arrangement of a pattern element is represented by an arrangement of multiple instances of the pattern element in a subcarrier subrange such that each instance is neighboring to at least one other instance.

5. The method according to claim 1, wherein the CSI-RS pattern is transmitted based on a coexistence indication indicating presence of Cell-Specific Reference Signaling.

6. The method according to claim 1, wherein the reference subcarrier corresponds to a central-frequency subcarrier or DC subcarrier of an LTE carrier.

7. The method according to claim 1, wherein the interrupting pattern comprises one subcarrier not for carrying CSI-RS, which may be arranged on the reference subcarrier, or on a subcarrier neighboring the reference subcarrier.

8. A network node for a New Radio, NR, radio access network, the network node comprising:
a transmitter configured to:
transmit channel state information reference signaling, CSI-RS, the CSI-RS having a CSI-RS pattern in frequency domain over a range of subcarriers including a reference subcarrier, such that in a first frequency range below the reference subcarrier, the CSI-RS pattern comprises a first sub-pattern represented by a repeated flush arrangement of a pattern element covering a number NP of subcarriers, the repeated flush arrangement being an arrangement of multiple instances of the pattern element in a subcarrier subrange such that each instance of the pattern element is neighboring to at least one other instance of the pattern element, and in a second frequency range above the reference subcarrier, the CSI-RS pattern comprises a second sub-pattern represented by a repeated flush arrangement of the pattern element, the first sub-pattern and the second sub-pattern being separated in frequency domain by an interrupting pattern having a number NI of subcarriers, NI>0 and NI being different from NP, the size of NI being dependent on how close to the reference subcarrier the closest pattern element of at least one of the first sub-pattern and second sub-pattern element is at least one of arranged and mapped.

9. The network node according to claim 8, wherein the pattern element comprises a plurality of subcarriers, wherein each subcarrier of the pattern element is neighboring to at least one other subcarrier of the pattern element, wherein the plurality of subcarriers comprises one or more subcarriers for carrying CSI-RS and one or more subcarriers not for carrying CSI-RS.

10. The network node according to claim 8, wherein the pattern element comprises a comb element that combines one subcarrier for carrying CSI-RS and one or more subcarriers not for carrying CSI-RS.

11. The network node according to claim 8, wherein repeated flush arrangement of a pattern element is represented by an arrangement of multiple instances of the pattern element in a subcarrier subrange such that each instance is neighboring to at least one other instance.

12. A method of operating a user equipment in a New Radio, NR, radio access network, the method comprising:
receiving channel state information reference signaling, CS-RS, receiving the CSI-RS being based on a CSI-RS pattern associated to the CSI-RS signaling, the CSI-RS pattern covering in frequency domain a range of subcarriers, and being determined, based on a coordination indication indicating presence of Cell-Specific Reference Signaling, to include a reference subcarrier, and to comprise, in a frequency range below the reference subcarrier, a first sub-pattern represented by a repeated flush arrangement of a pattern element covering a number NP of subcarriers, the repeated flush arrangement being an arrangement of multiple instances of the pattern element in a subcarrier subrange such that each instance of the pattern element is neighboring to at least one other instance of the pattern element, and to comprise in a second frequency range above the reference subcarrier, a second sub-pattern represented by a repeated flush arrangement of the pattern element, the first sub-pattern and the second sub-pattern being separated by an interrupting pattern having a number NI of subcarriers, NI>0 and NI is being different from NP, the size of NI being dependent on how close to the reference subcarrier the closest pattern element of at least one of the first sub-pattern and second sub-pattern element is at least one of arranged and mapped.

13. The method according to claim 12, wherein the pattern element comprises a plurality of subcarriers, wherein each subcarrier of the pattern element is neighboring to at least one other subcarrier of the pattern element, wherein the plurality of subcarriers comprises one or more subcarriers for carrying CSI-RS and one or more subcarriers not for carrying CSI-RS.

14. The method according to claim 12, wherein the pattern element comprises a comb element that combines one subcarrier for carrying CSI-RS and one or more subcarriers not for carrying CSI-RS.

15. The method according to claim 12, wherein repeated flush arrangement of a pattern element is represented by an arrangement of multiple instances of the pattern element in a subcarrier subrange such that each instance is neighboring to at least one other instance.

16. A user equipment for a New Radio, NR, radio access network, the user equipment comprising:
a receiver configured to:
receive channel state information reference signaling, CSI-RS, receiving the CSI-RS being based on a CSI-RS pattern associated to the CSI-RS signaling, the CSI-RS pattern covering in frequency domain a range of subcarriers, and being determined, based on a coordination indication indicating presence of Cell-Specific Reference Signaling, to include a reference subcarrier, and to comprise, in a frequency range below the reference subcarrier, a first sub-pattern represented by a repeated flush arrangement of a pattern element covering a number NP of subcarriers, the repeated flush arrangement being an arrangement of multiple instances of the pattern element in a subcarrier subrange such that each instance of the pattern element is neighboring to at least one other instance of the pattern element, and to comprise in a second frequency range above the reference subcarrier, a second sub-pattern represented by a repeated flush arrangement of the pattern element, the first sub-pattern and the second sub-pattern being separated by an interrupting pattern having a number NI of subcarriers, NI>0 and NI being different from NP, the size of NI being dependent on how close to the reference subcarrier the closest pattern element of at least one of the first sub-pattern and second sub-pattern element is at least one of arranged and mapped.

17. The user equipment according to claim 16, wherein the pattern element comprises a plurality of subcarriers, wherein each subcarrier of the pattern element is neighboring to at least one other subcarrier of the pattern element, wherein the plurality of subcarriers comprises one or more subcarriers for carrying CSI-RS and one or more subcarriers not for carrying CSI-RS.

18. The user equipment according to claim 16, wherein the pattern element comprises a comb element that combines one subcarrier for carrying CSI-RS and one or more subcarriers not for carrying CSI-RS.

19. The user equipment according to claim 16, wherein repeated flush arrangement of a pattern element is represented by an arrangement of multiple instances of the pattern element in a subcarrier subrange such that each instance is neighboring to at least one other instance.

\* \* \* \* \*